A. L. S. McCURDY.
PROCESS OF MANUFACTURING CREAMS, CUSTARDS, AND THE LIKE.
APPLICATION FILED MAY 18, 1914.
1,190,181.  
Patented July 4, 1916.
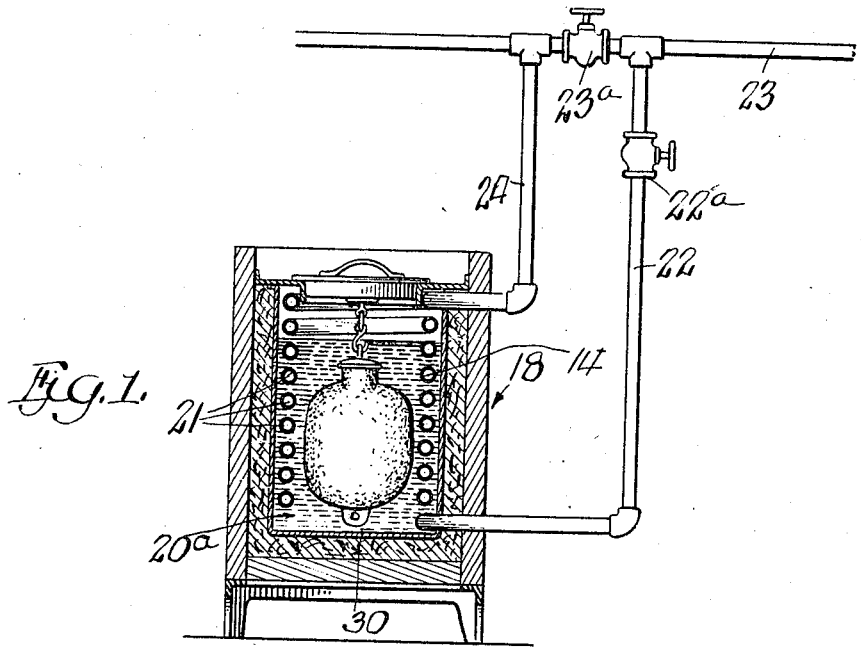
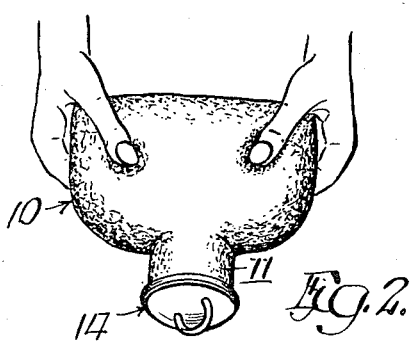
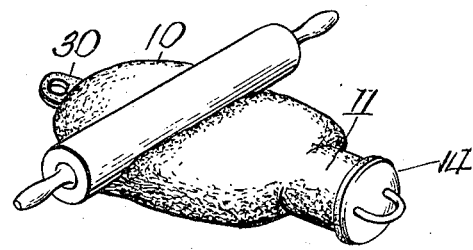
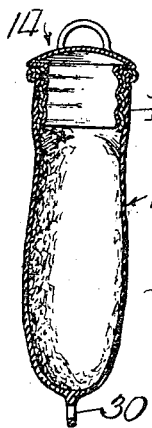
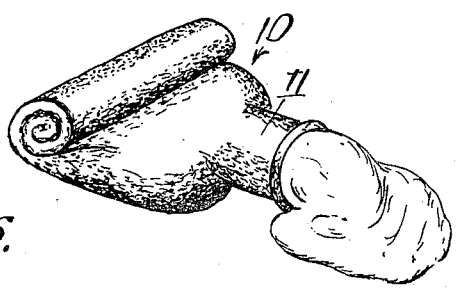
Witnesses:
Inventor  
Arthur L. S. McCurdy  
by Bronson & Mekllope, Attys

UNITED STATES PATENT OFFICE.

ARTHUR L. S. McCURDY, OF CHICAGO, ILLINOIS, ASSIGNOR TO LARSEN ICE MACHINE COMPANY (INC.), OF WILMINGTON, DELAWARE, A CORPORATION OF DELAWARE.

PROCESS OF MANUFACTURING CREAMS, CUSTARDS, AND THE LIKE.

1,190,181.  Specification of Letters Patent.  Patented July 4, 1916.

Application filed May 18, 1914. Serial No. 839,273.

*To all whom it may concern:*

Be it known that I, ARTHUR L. S. MC-CURDY, a subject of the King of Great Britain, and a resident of Chicago, in the county of Cook and State of Illinois, have invented certain new and useful Improvements in Processes of Manufacturing Creams, Custards, and the like; and I do hereby declare that the following is a full, clear, and exact description thereof, reference being had to the accompanying drawings, and to the letters of reference marked thereon, which form a part of this specification.

This invention relates to a new process for manufacturing creams, custards and the like, and consists of the matters hereinafter described and more particularly pointed out in the appended claims.

In the usual way of making ice cream and frozen custards, the necessary ingredients are mixed together and are then placed in a freezer consisting of a can for the fluid mixture that is to be frozen, and a bucket adapted to receive said can and to provide a jacket space about the can to be packed with the freezing mixture. Means are provided in connection with the freezer, for agitating the fluid cream or custard during the process of freezing in order that when it is made, the ice or ice cream will be smooth and not composed of a mass of hard and brittle crystals, which would be the case were it frozen without the agitation referred to. In making ice cream in this way, an apparatus is required which includes parts that are hard to keep clean, since they have many corners and pockets in which the cream or custard mixture may lodge, and which are difficult to get at, no matter what care is used in washing or scrubbing the apparatus. The result is that ptomaine poisoning may occur the next time the freezer is used. In addition, this way of freezing creams or custards is laborious in that it requires considerable labor and effort to turn the crank or operate the other mechanism by means of which the required agitation of the mixture is carried on during the period required for its proper freezing.

In my process, the time necessary for freezing is materially lessened, the work required is greatly diminished, and the apparatus used for carrying it out is such that it may be quickly and efficiently cleansed. In addition, a greatly superior product is produced in that the frozen cream, custard, and the like, is smooth and entirely free from any crystalline formation.

The various advantages of my improved process will appear as I proceed with my specification.

In order to illustrate my process, I append hereto a drawing, in which:

Figure 1 is a view representing a vertical section through the freezer in which is placed a waterproof bag that contains cream or custard to be frozen. Figs. 2, 3 and 4 are perspective views illustrating various stages in carrying out my process, to be referred to more particularly later. Fig. 5 is a section through the bag used in my process.

In illustrating one way of carrying out my improved process for freezing creams or custards, I have shown herein a freezer such as that described in an application of even date, filed by myself and Malcolm F. Ewen. Any freezing apparatus may be used in carrying out my process, and I have simply illustrated this particular freezer as an example of freezer which may be conveniently adopted, without the necessity for the use of ice to do the freezing. Of course, instead of the freezer shown, a freezer adapted for the use of any freezing mixture, as ice and salt, may be used in its stead.

The freezer shown is adapted to be used in connection with a refrigerating apparatus and is to be connected to the system by suitable by-pass pipes interposed in the conduit connecting the condenser with the main expansion coil in the refrigerator. The said freezer consists of an insulated box or container 18, in which is placed an auxiliary expansion coil 21, which is connected at its inlet and outlet ends respectively to pipes 22, 24, which lead from and back to a pipe 23. The pipe 23 is the conduit leading from the condenser to the main expansion coil. (Not shown.) Suitable hand valves 22ª and 23ª are provided for controlling the flow of the refrigerating fluid to the expansion coil 21.

Within the container 18, there is suspended a flat, flexible waterproof bag 10, which is adapted to hold the mixture to be frozen.

20ª indicates liquid or brine within the container for forming a liquid seal between the expansion coil 21 and the bag 10. The bag, as shown, is suspended within the brine by means of a chain 30, depending from a lid 27 that incloses the space in the container within the expansion coil.

The bag 10 is of any suitable construction and made of any suitable water-proof material. Preferably it is such as the ordinary ice or water bag and is made of flexible material, such as rubber or the like, so that it will readily accommodate itself to the space in which it is placed. The bag has a neck, 11, provided with an open mouth which is closed by means of a threaded cap 14 in a familiar manner.

In making the frozen cream or custard, the ingredients are first mixed and poured into the bag 10, just as they have heretofore been placed in the can of the freezer. The cap is then screwed in place and the bag 10 is placed within the freezer, being in the example illustrated suspended within the brine contained in the freezer. The freezer is then closed and the bag is allowed to remain in the freezing chamber until the contents are frozen to about the hardness of ice cream. The bag may be removed from the freezer from time to time in order to determine whether the contents are properly frozen.

After the mixture is frozen, the bag is removed from the freezer and is kneaded by means of the hands, as shown in Fig. 2, or by means of a rolling pin, or similar device, as shown in Fig. 3. The kneading process breaks up the ice crystals formed in the mixture, during the freezing period. If the contents of the bag are not frozen through, the bag may be then replaced in the freezer and the freezing process continued somewhat longer, when the bag is again removed and the process of kneading repeated. The alternate freezing and kneading is continued until the mixture in the bag becomes smooth and of the desired consistency throughout, when the cap or cover of the bag is removed and the contents thereof are discharged from the bag. As shown in Fig. 4, the contents may be conveniently removed by rolling the bag upon itself. This completes the process. The frozen cream or custard may then be molded into any desired form in the usual manner.

The bag, being smooth on the inside, manifestly, may be quickly and efficiently cleaned, and there is no danger of any unpleasant results due to lack of cleanness, when the bag is again used in carrying out the freezing process. The bag is provided with the usual apertured ear 30, for hanging it bottom upward to entirely drain out the water with which it has been washed. The resulting frozen cream or custard is completely and evenly frozen throughout, and at the same time is smooth and entirely free from ice crystals, so that it is superior to the ice cream and frozen custards made by the old process.

Since the bag used in carrying out my process may be flat and need not be cylindrical (which is necessary in the usual ice cream freezers where a relatively rotary dasher is used), the time required to freeze custards or creams by my process is greatly reduced, since the mixture is included in a space which is spread out in two directions but limited in one direction; thus the freezing process will be quickly carried through the mixture.

I claim as my invention:

1. The process of manufacturing creams, custards and the like, which consists in freezing the same in a flexible waterproof bag, and in then kneading said bag until the ice crystals therein have been disintegrated and broken.

2. The process of manufacturing creams, custards and the like, which consists in placing the same in a flat, flexible waterproof bag, subjecting the bag and its contents to a freezing temperature, and then kneading the bag with its contents, then subjecting the bag and its contents again to a freezing temperature and thereafter repeating the kneading step, the freezing and kneading steps being continued until the mixture is brought to the desired consistency.

In testimony that I claim the foregoing as my invention I affix my signature in the presence of two witnesses, this 25th day of April A. D. 1914.

ARTHUR L. S. McCURDY.

Witnesses:
   T. H. ALFREDS,
   KAEL W. DOLL.